(12) United States Patent
Yang et al.

(10) Patent No.: US 7,600,547 B2
(45) Date of Patent: Oct. 13, 2009

(54) VARIABLE LAMINATION RAPID PROTOTYPING APPARATUS FOR PRODUCING LARGE SCALE 3-DIMENSIONAL OBJECT

(75) Inventors: Dong Yol Yang, Daejeon (KR); Hyo Chan Kim, Jeonju-si (KR); Sang Ho Lee, Daejeon (KR); Seung Kyo Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 853 days.

(21) Appl. No.: 11/202,639

(22) Filed: Aug. 12, 2005

(65) Prior Publication Data
US 2006/0054282 A1  Mar. 16, 2006

(30) Foreign Application Priority Data
Aug. 13, 2004 (KR) .............. 10-2004-0063705
Jul. 22, 2005 (KR) .............. 10-2005-0066606

(51) Int. Cl.
*B32B 37/18* (2006.01)
*B32B 41/00* (2006.01)
(52) U.S. Cl. .............. 156/353; 156/364; 156/558
(58) Field of Classification Search .............. 156/353, 156/354, 355, 362, 363, 364, 378, 379, 510, 156/558; 83/651.1
See application file for complete search history.

(56) References Cited

U.S. PATENT DOCUMENTS 5,698,121 A * 12/1997 Kosaka et al. .......... 219/121.67
2001/0040003 A1 * 11/2001 Yang et al. .................. 156/264
2003/0006001 A1 * 1/2003 Yang et al. .................. 156/250

FOREIGN PATENT DOCUMENTS

KR  20030004638  1/2003

* cited by examiner

Primary Examiner—George R Koch, III
(74) Attorney, Agent, or Firm—Kevin D. Jablonski; Graybeal Jackson LLP

(57) ABSTRACT

The variable lamination rapid prototyping apparatus of the present invention includes a first feeding means which longitudinally reciprocates a sheet, a second feeding means which is provided under the first feeding means and reciprocates in a direction transverse to the sheet, and a rotating means which is coupled to the second feeding means and rotates around an axis parallel to the transverse direction of the sheet. The apparatus further includes a translation means which is linked to the rotating means, a cutting means which is coupled to the translation means, and a stacking means which subsequently stacks a plurality of cut sheets, thus forming the 3-dimensional object. The apparatus further includes a control means which previously stores data about the object therein and controls the above-mentioned plurality of means based on the data. Because a hot wire is provided in a parallelogram link structure, superior cutting accuracy and the stability are ensured. Furthermore, because the link structure is adjustable in length, it is possible to easily cut a sheet regardless of the size of the sheet.

1 Claim, 3 Drawing Sheets

VARIABLE LAMINATION RAPID PROTOTYPING APPARATUS FOR PRODUCING LARGE SCALE 3-DIMENSIONAL OBJECT

CROSS-REFERENCE TO RELATED APPLICATIONS

This application claims foreign priority benefits under 35 USC §119(a) to Korean Patent Application No. 2004-63705, filed 13 Aug. 2004, and Korean Patent Application No. 2005-66606, filed 22 Jul. 2005, both of which are incorporated herein by reference.

BACKGROUND OF THE INVENTION

1. Field of the Invention

The present invention relates generally to rapid prototyping apparatuses for machining unit lamination substances used for prototyping large scale 3-dimensional objects and, more particularly, to a variable lamination rapid prototyping apparatus for producing a large scale 3-dimensional object which can rapidly and easily machine large scale sheets.

2. Description of the Related Art

Conventional rapid prototyping methods are classified into a curing method of forming a 3-dimensional shape by irradiating a radiation curable material with a laser beam, and a method of forming a desired shape by aggregating granular or lamellar solid material.

Generally, a rapid prototyping process means a process of directly prototyping a 3-dimensional trial product (object) using metal or nonmetallic material, such as paper, wax, ABS (acrylonitrate-butadiene-styrene), plastic, etc., based on 3-dimensional CAD (computer aided design) data. Recently, the range of materials for use in the process has expanded to metal powder, metal wire and the like, so that 3-dimensional objects have been prototyped by various rapid prototyping processes.

In the lamellar materials bonding technologies of the rapid prototyping processes, there are a laminated object manufacturing (LOM) technique which was proposed by Helisys, Inc. of the United States, and a Shapemaker □ technology which was developed by Utah University in the United States.

According to the conventional laminated object manufacturing technique, a 3-dimensional object is manufactured by repeating operations of compressing and bonding laminated paper sheets (0.106 mm or so) using heated rollers and by cutting the bonded paper sheets using a laser. However, this technique is problematic in that, because a laser is used to cut the laminated paper sheets, it takes a relatively long time to manufacture a 3-dimensional object and, as well, the manufacturing costs are very high. Furthermore, because a support unit used for shaping the 3-dimensional object must be removed after the 3-dimensional object is produced, there is a disadvantage in that it takes a long time.

In the Shapemaker II technology, relatively thick pieces of material having a thickness of 25.4 mm or more are cut by a hot wire cutting device having two plotter heads and, thereafter, are stacked and bonded together, thus producing a 3-dimensional object. However, this technique is problematic in that the hot wire cutting device cannot speedily rotate because two plotter heads are provided in the hot wire cutting device. Furthermore, because the hot wire varies in length according to the rotation angle of the hot wire cutting device, it is very difficult to maintain a constant heat capacity of the hot wire. Due to the variation in the heat capacity of the hot wire, dimensional accuracy is deteriorated.

In an effort to overcome the above-mentioned problems, a transfer type variable lamination manufacturing (VLM-ST) technique was proposed in Korean Laid-open Publication No. 2003-4638, entitled 'INTERMITTENT MATERIAL FEED TYPE VARIABLE-LAMINATION RAPID PROTOTYPING PROCESS AND APPARATUS USING LINEAR THERMAL CUTTING SYSTEM'. According to this technique, sheets 10 mm or thinner and having A4 or A3 size are intermittently fed. Thereafter, in a stationary state, a linear thermal cutting system, which has a cantilever shape and is operated through a 4-axis simultaneous control method, cuts fed sheets while moving in X-axis, Y-axis, $\theta_x$, and $\theta_y$ directions, thus forming unit lamination substances, circumferential edges of which are inclined at predetermined angles. Thereafter, the unit shaped-sheets are manually stacked and bonded together. The technique of No. 2003-4638 can rapidly and precisely machine the sheets, unlike the above-mentioned prior technique. In addition, it is possible to provide an edge inclination to each sheet. Therefore, this technique is advantageous in that the time, for post-processing which is required after the shaped sheets are stacked, is markedly reduced.

However, in the technique of No. 2003-4638, because the linear thermal cutting system which cuts the sheets has the cantilever shape, the sheets are limited in size. In detail, as the size of the sheet is increased, the length of a translation rod to support the hot wire thereon also must be increased. This causes a reduction in cutting accuracy. Despite the above-mentioned problems, no rapid prototyping apparatus for producing large scale products has been developed. Furthermore, technology for producing large scale products depends on manual labor and is slow.

SUMMARY OF THE INVENTION

Accordingly, the present invention has been made keeping in mind the above problems occurring in the prior art, and an object of the present invention is to provide a variable lamination rapid prototyping apparatus for producing a large scale 3-dimensional object in which a cutting function is applied to a parallelogram link structure the length of which is easily adjusted so that a fed sheet is precisely cut and prototyped into a desired shape regardless of the size of the sheet.

In order to accomplish the above object, the present invention provides a variable lamination rapid prototyping apparatus, including: a first feeding means to longitudinally reciprocate a sheet; a second feeding means provided under the first feeding means and reciprocating in a direction transverse to the sheet; a rotating means coupled to the second feeding means and rotating around an axis parallel with the transverse direction of the sheet; a translation means disposed in the transverse direction of the sheet and linked to the rotating means so that the translation means executes a translational motion; a cutting means coupled at a predetermined position to the translation means and cutting the sheet; a stacking means subsequently stacking a plurality of sheets cut by the cutting means, thus forming a 3-dimensional object; and a control means previously storing data about the 3-dimensional object therein and controlling the first feeding means, the second feeding means, the rotating means, the translation means, the cutting means and the stacking means based on the data.

The rotating means may include a pair of yokes rotatably coupled to respective opposite sides of the second feeding means such that rotating shafts of the yokes are parallel with the transverse direction of the sheet; and a first motor coupled to at least one yoke to rotate the yokes.

The translation means may include a pair of rotating links rotatably coupled to the respective yokes; a pair of horizontal links arranged above and below the sheet to be parallel to each other and linked to opposite ends of the rotating links; and a second motor coupled to at least one rotating link, thus translating the horizontal links.

The cutting means may include a hot wire connecting the horizontal links to each other.

The first feeding means may comprise a conveyor.

The stacking means may include a support table on which the cut sheets are stacked; a stacking assistant means holding the cut sheets, carrying the sheets to a desired position on the support table, and stacking the sheets; and a bonding agent application means applying a bonding agent to upper surfaces of the sheets to be stacked on the support table.

The variable lamination rapid prototyping apparatus may further include a sheet supplying means provided around a side of the first feeding means to supply the sheets to the first feeding means.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be explained in detail with reference to the attached drawings.

Figure 1:
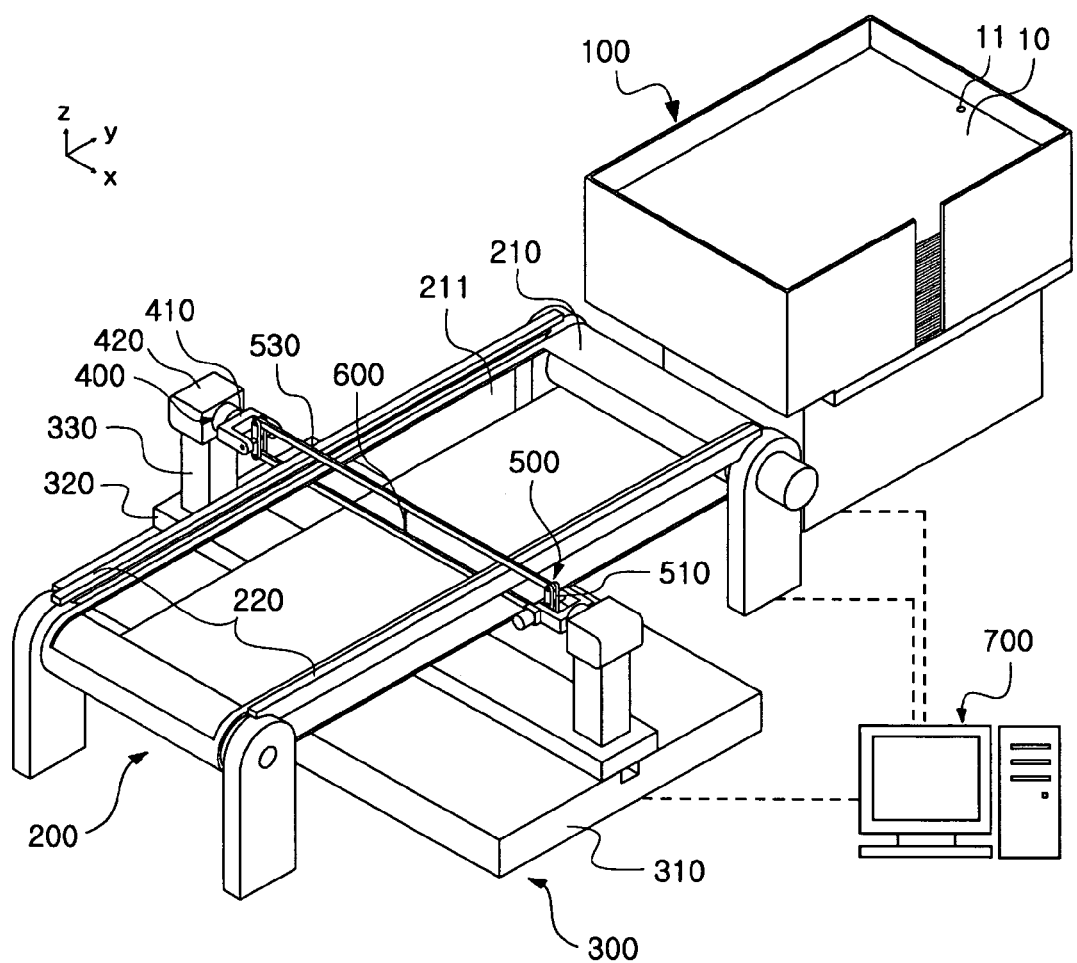
FIG. 1 is a perspective view showing the constitution of a variable lamination rapid prototyping apparatus, according to a preferred embodiment of the present invention.

FIG. 1 is a perspective view showing the constitution of a variable lamination rapid prototyping apparatus, according to the preferred embodiment of the present invention.

Figure 2:
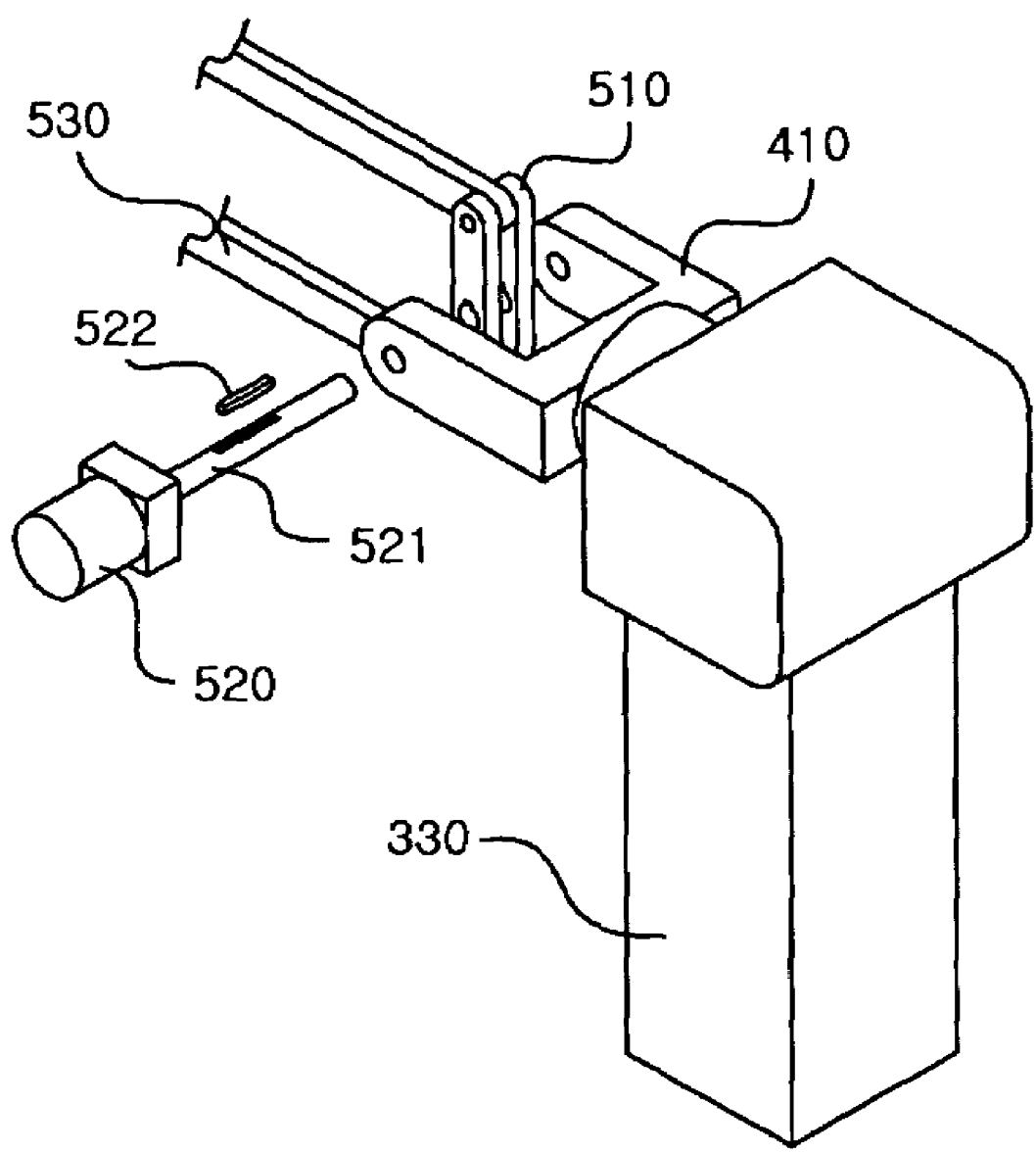
FIG. 2 is a partially exploded perspective view showing the relationship between a translation means and a rotating means of FIG. 1.
Figure 3:
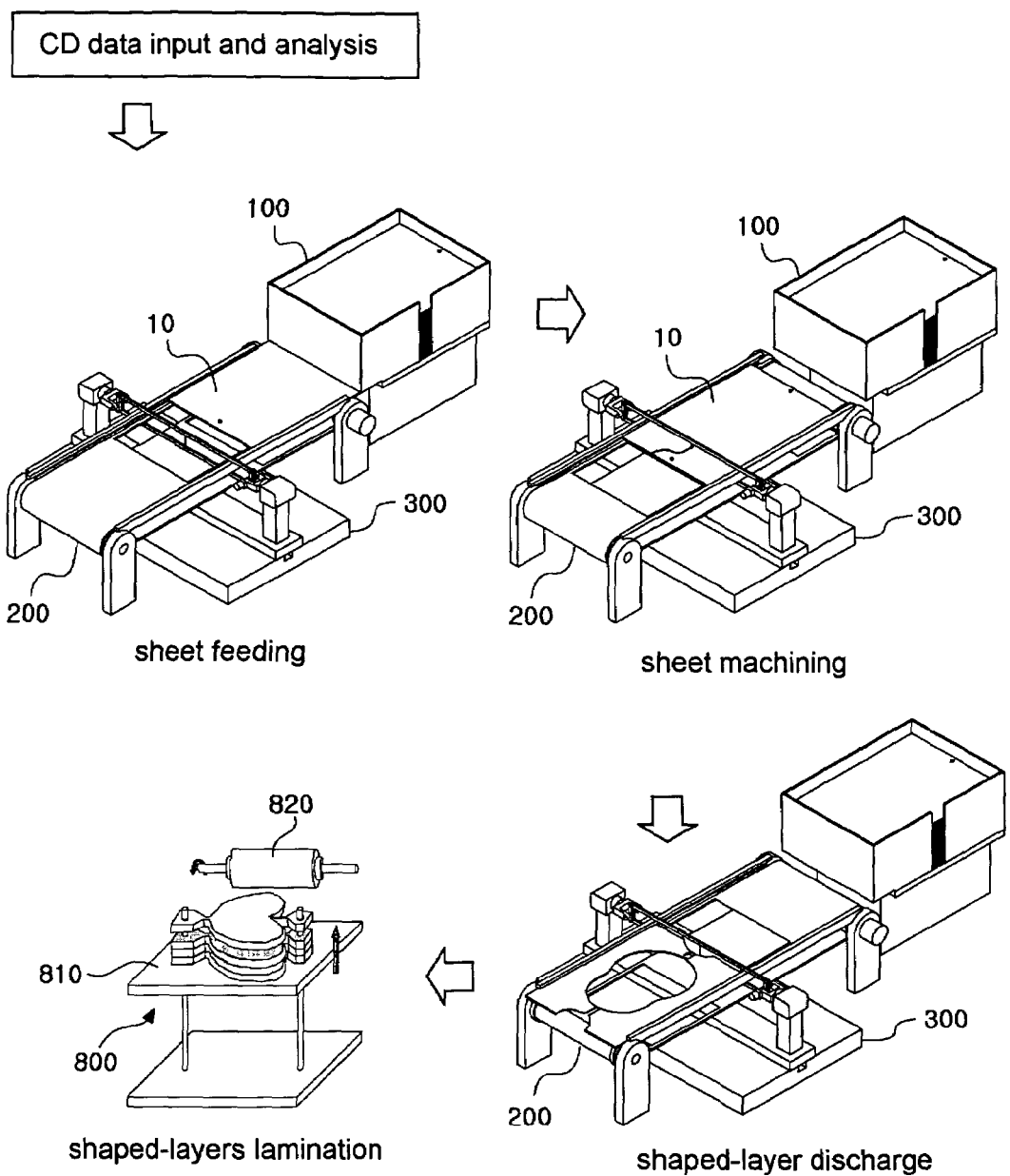
FIG. 3 is a flowchart showing the operation of machining a plurality of sheets using the rapid prototyping apparatus of FIG. 1.

FIG. 2 is a partially exploded perspective view showing the relationship between a translation means and a rotating means of FIG. 1. FIG. 3 is a flowchart showing the operation of machining a plurality of sheets using the rapid prototyping apparatus of FIG. 1.

As shown in FIGS. 1 through 3, the variable lamination rapid prototyping apparatus according to the embodiment of the present invention includes a sheet supplying means 100 which stores a plurality of sheets 10 therein and supplies the sheets 10, and a conveyor 200 which reciprocates the fed sheets 10 in a longitudinal direction. The variable lamination rapid prototyping apparatus further includes a transverse feeding means 300 which reciprocates in a direction transverse to the sheet 10, and a rotating means 400 which is coupled to the transverse feeding means 300 and rotates around an axis transverse to the sheet 10. The variable lamination rapid prototyping apparatus further includes a translation means 500 which is linked to the rotating means 400 so that the translation means 500 translates in a direction transverse to the sheet 10, a cutting means which is coupled at a predetermined position to the translation means 500 so as to cut the sheet, and a system control means 700 which controls all of the above-mentioned every means based on data about a 3-dimensional object to be produced, thus manufacturing unit lamination substances constituting the 3-dimensional object. The variable lamination rapid prototyping apparatus further includes a stacking means 800 which subsequently stacks the unit lamination substances, thus forming the 3-dimensional object.

The sheet supplying means 100 stores a plurality of sheets 10 therein and intermittently feeds the sheets 10 to the conveyor 200 according to signals from the system control means 700. For this, the sheet supplying means 100 has therein a separate feeding unit to supply the sheets 10 towards the conveyor 200 according to the signals from the system control means 700. In this embodiment, the separate feeding unit has a construction typical of that used in a related industrial field.

The conveyor 200 serves as a feeding means that supports the sheet 10, fed from the sheet supplying means 100, and linearly reciprocates it in a y-axial direction (in a longitudinal direction of the sheet) according to CAD data input in the system control means 700.

A guide 220 is provided on each of opposite sides of the conveyor 200. The guides 220 serve to correct the position of the sheet 10 being reciprocated by the conveyor 200. Here, the guides 220 may be constructed such that the distance between them may be adjusted in a direction transverse to the sheet 10. A conveyor belt 210 is wound around the conveyor 200 to reciprocate the sheet 10.

A rectangular opening 211 which is longer in length and narrower in width than the sheet 10 is formed at a predetermined portion on the conveyor belt 210. The rectangular opening 211 prevents the conveyor belt 210 from interfering with a hot wire 600 of the cutting means for cutting the sheet 10. Therefore, the rectangular opening 211 must be formed at the position at which the sheet 10 is placed on the conveyor belt 210. It is preferred that the length of the conveyor 200 be two times the length of the sheet 10. This ensures the cutting range of the hot wire 600 throughout the entire length of the sheet 10.

The transverse feeding means 300 is constructed such that a feeding operation of the transverse feeding means 300 is executed in an x-axial direction (in a transverse direction of the sheet 10). Thus, the transverse feeding means 300 reciprocates the cutting means in a direction perpendicular to the direction in which the sheet 10 is reciprocated by the conveyor 200. To achieve the above-mentioned purpose, the transverse feeding means 300 is perpendicularly provided under the conveyor 200, as shown in FIG. 1. Furthermore, the transverse feeding means 300 has a support plate 310 which is disposed on a support surface, and a movable plate 320 which is coupled to the upper surface of the support plate 310 and is movable in a transverse direction of the sheet. Here, the movable plate 320 is shifted on the support plate 310 by a typical shifting method such as a method using a screw. As such, the movable plate 320 reciprocates in the transverse direction of the sheet 10 (in the x-axial direction) according to the signal of the system control means 700.

Two supports 330 are provided on opposite ends of the movable plate 320 and are symmetrical to each other based on the conveyor 200. A yoke 410 is provided on each of the supports 330 and is rotatable in a y-z plane around an axis parallel to the transverse direction of the sheet. A motor 420 is provided on at least one support 330 to rotate the yoke 410. As such, in this embodiment, the yokes 410 and the motor 420 serve as the rotating means 400.

The rotating link 510, which rotates on a plane perpendicular to the plane on which the yoke 410 rotates, is coupled to each of the yokes 410. As shown in FIG. 2, a motor 520 is provided on at least one yoke 410 to rotate the rotating link 510. As shown in FIG. 2, an output shaft 521 of the motor 520 is coupled to the rotating link 510 by a locking pin 522. Here, rotating angles of both the yokes 410 and the rotating links 510 are controlled by the system control means 700 which controls both the motors 420 and 520.

Two horizontal links 530 are coupled to opposite ends of the rotating links 510, so that the horizontal links 530 parallelly connect the two rotating links 510, which are spaced apart from each other by a predetermined distance based on the conveyor 200. Here, the horizontal links 530 are positioned above and below the sheet 10 placed on the conveyor 200. That is, the plurality of rotating links 510 and horizontal links 530, which are coupled together, form a parallelogram structure that transversely surrounds the sheet 10 placed on the conveyor 200. The rotating links 510 and horizontal links 530 are translated on an x-z plane. As such, in this embodiment, the pair of rotating links 510, the motor 520 and the pair of horizontal links 530 serve as the translation means 500.

The hot wire 600 vertically couples portions of the horizontal links 530 to each other. The hot wire 600 is moved in the latitudinal direction of the sheet 10 by the movement of the support plate 310 and is rotated around the x-axis (θx) and y-axis (θy) by the rotation of the yokes 410 and the rotation of the rotating links 510, respectively. Therefore, the cross-section of the sheet 10, placed between the pair of horizontal links 530, is formed in various shapes having inclined surfaces by the two-axis cutting operation of the hot wire 600. The hot wire 600 is heated by a voltage applying device. In this embodiment, the hot wire 600 and the voltage applying device serve as the cutting means. To ensure the cutting range of the hot wire 600 throughout the entire width of the sheet 10, the distance between the supports 330 is preferably two times the width of the sheet 10 or more. As a result, in the present invention, a large sheet can be easily machined by adjusting the distance between the two supports 330.

The stacking means 800 is constructed such that its height can be adjusted. The stacking means 800 includes a support table 810 which has an insertion rod which is inserted into positioning holes 11 of unit lamination substances machined by the cutting means, thus stably stacking the unit lamination substances. The stacking means 800 further includes a stacking assistant means which vacuum-holds the machined unit lamination substances, carries them to a desired position on the support table, and stacks them. The stacking means 800 further includes a bonding agent application means 820 which applies a bonding agent to upper surfaces of the unit lamination substances to be stacked on the support table 810. In this embodiment, the stacking means 800 is controlled by the system control means 700 such that a unit lamination substance is placed at a desired position on the support table 810 by the stacking assistant means before the bonding agent application means 820 applies a bonding agent to the upper surface of the placed unit lamination substance, and such that the above-mentioned process is repeatedly conducted.

The operation of the variable lamination rapid prototyping apparatus of the present invention will be described herein below.

As shown in FIG. 3, a process of machining sheets consists of four steps.

The first step is a step of inputting CAD data and analyzing it.

First, CAD data describing a desired 3-dimensional prototype, the thickness and size of each of the stacked sheets 10, and the size and reduction scale of a 3-dimensional object with respect to the 3-dimensional prototype are input into the system control means 700. The system control means 700 partitions the desired 3-dimensional object, which constitutes the input CAD data, into a plurality of layers in consideration both of the thickness of the sheet 10 and of the reduction scale of the 3-dimensional object, and then determines the cutting path for each sheet 10 according to each partitioned layer. As well, the system control means 700 calculates a cutting volume per unit time in consideration of the heat capacity of the cutting means. As a result, the feeding velocity of the cutting means is determined.

The second step is a step of feeding the sheets 10 onto the conveyor 200.

After the basic computation for the cutting process based on the CAD data input into the system control means 700 is completed, the sheet supplying means 100 supplies one sheet 10 to the conveyor 200 in response to a start signal from the system control means 700. Thereafter, the sheet supplying means 100 does not supply the subsequent sheet 10 until an additional signal is input.

The third step is a step of cutting and machining the fed sheet 10.

When the sheet 10 is supplied onto the conveyor 200, a sensor monitors this and signals the system control means 700. Then, the system control means 700 controls the conveyor 200, the transverse feeding means 300, the rotating means 400, the translation means 500 and the cutting means according to the cutting path determined at the first step, whereby the sheet 10 is machined into a desired shape. In this embodiment, the hot wire 600 is rotatable around the x-axis (θx) and y-axis (θy) as well as being movable in the plane. Accordingly, it is possible to form an inclined cut surface in the sheet 10. Meanwhile, each sheet 10 has at least one positioning hole 11 therein. The sheet 10 is cut relative to the positioning hole 11.

The fourth step is a step of stacking the unit lamination substance, that is, the machined sheet 10, and supplying another sheet 10 onto the conveyor 200.

After the process of machining the sheet 10 corresponding to one partitioned layer is completed, the unit lamination substance is placed at a desired position on the support table 810 by the stacking assistant means of the stacking means 800. Thereafter, the bonding agent application means 820 applies a bonding agent to the upper surface of the unit lamination substance. The remainder of the machined sheet 10 is discharged to the outside by the operation of the conveyor 200, before another sheet is supplied to the conveyor 200 by the sheet supplying means 100. The system control means 700, thereafter, performs control such that the sheet corresponding to another partitioned layer is machined into a new unit lamination substance and the machined unit lamination substance is stacked on the unit lamination substance which was previously stacked on the support table 810. This process is repeatedly executed until the desired 3-dimensional object is completed. After the desired 3-dimensional object has been completed through the above-mentioned process, the parts of the 3-dimensional object in which the positioning holes 11 are formed are removed from the 3-dimensional object. The portions of the 3-dimensional object from which the parts having the positioning holes 11 have been removed are polished.

As described above, in the present invention, because a hot wire is provided in a parallelogram link structure, superior cutting accuracy and stability are ensured. Furthermore, because the link structure is adjustable in length, it is possible to easily cut a sheet regardless of the size of the sheet.

Although the variable lamination rapid prototyping apparatus for producing a large scale 3-dimensional object according to the present invention has been disclosed with the accompanying drawings for illustrative purposes, it only shows preferred embodiments of the present invention, and does not limit the present invention.

In addition, those skilled in the art will appreciate that various modifications, additions and substitutions are possible, without departing from the scope and spirit of the invention as disclosed in the accompanying claims.

What is claimed is:

1. A variable lamination rapid prototyping apparatus, comprising:
   a conveyor belt to longitudinally reciprocate a sheet;
   a support plate provided under the conveyor belt;
   a movable plate coupled to the upper surface of the support plate and movable in a transverse direction of the sheet;
   a pair of yokes rotatably coupled to respective opposite sides of the movable plate such that rotating shafts of the yokes are parallel with the transverse direction of the sheet;
   a first motor coupled to at least one yoke to rotate the yokes;
   a pair of rotating links rotatably coupled to the respective yokes;
   a pair of horizontal links arranged above and below the sheet to be parallel to each other and linked to opposite ends of the rotating links;
   a second motor coupled to at least one rotating link, thus translating the horizontal links;
   a hot wire connecting the horizontal links to each other such that cutting the sheet;
   a support table subsequently stacking a plurality of sheets cut by the cutting means, thus forming a 3-dimensional object; and
   a computer previously storing data about the 3-dimensional object therein and controlling the conveyor belt, the movable plate, the yokes, the first motor, the rotating links, the horizontal links, the second motor, the hot wire and support table based on the data.

* * * * *

UNITED STATES PATENT AND TRADEMARK OFFICE
CERTIFICATE OF CORRECTION

PATENT NO. : 7,600,547 B2  Page 1 of 1
APPLICATION NO. : 11/202639
DATED : October 13, 2009
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1097 days.

Signed and Sealed this

Fifth Day of October, 2010

David J. Kappos
*Director of the United States Patent and Trademark Office*